H. HOWARD.
PROCESS OF MAKING SOLID SODIUM BISULFITE.
APPLICATION FILED JAN. 28, 1913.
1,084,436.
Patented Jan. 13, 1914.
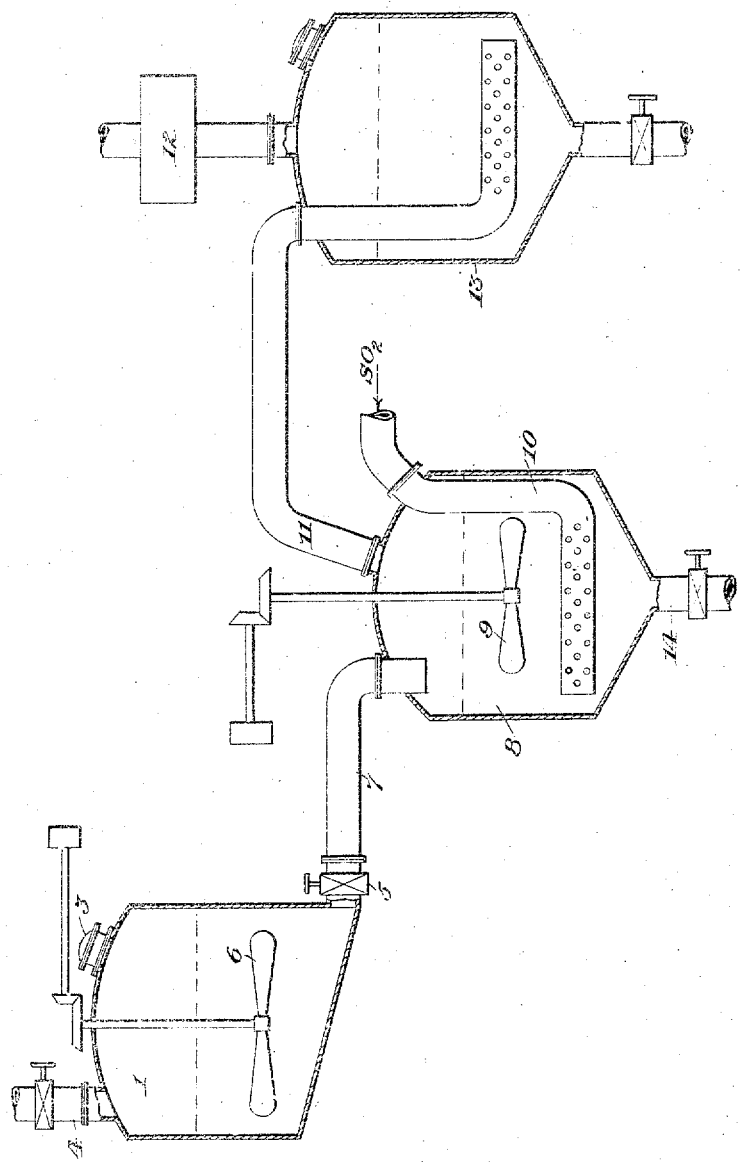

UNITED STATES PATENT OFFICE.

HENRY HOWARD, OF BOSTON, MASSACHUSETTS.

PROCESS OF MAKING SOLID SODIUM BISULFITE.

1,084,436.   Specification of Letters Patent.   Patented Jan. 13, 1914.

Application filed January 28, 1913. Serial No. 744,675.

*To all whom it may concern:*

Be it known that I, HENRY HOWARD, a citizen of the United States, residing at Boston, in the county of Suffolk and State of Massachusetts, have invented certain new and useful Improvements in Processes of Making Solid Sodium Bisulfite, of which the following is a specification.

This invention relates to a process of making solid sodium bisulfite, which is in part described but not claimed in my application Serial No. 718,977, filed September 6, 1912.

The object of my invention is to manufacture a stable solid salt of sodium bisulfite, substantially free from water of crystallization, and that does not deliquesce or decompose when exposed to the air. To produce a salt having these characteristics, I preferably first form sodium sulfite by adding to a saturated or strong solution of sodium bisulfite, in a closed tank, with agitation, a suitable sodium carbonate, as a solid, in such quantities that the carbonate (mono-carbonate, sesqui-carbonate or bi-carbonate, or a mixture of them) is decomposed by the sulfur dioxid of the bisulfite, forming neutral sodium sulfite and carbon dioxid. The reaction may be carried out at ordinary temperatures in which case some carbon dioxid will remain dissolved in the solution; or the reaction may be carried out with the aid of heat, whereby all the liberated carbon dioxid will be driven off and recovered. The reaction is as follows:

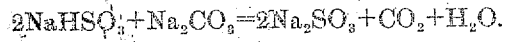
$$2NaHSO_3 + Na_2CO_3 = 2Na_2SO_3 + CO_2 + H_2O.$$

The carbon dioxid liberated is collected and passed through a scrubber containing sodium carbonate or bicarbonate, which delivers highly pure carbon dioxid.

The solution of sodium bisulfite first used may be in excess, in which case some will remain with the neutral sodium sulfite formed; or the original sodium bisulfite may also contain some neutral sodium sulfite which will remain in the solution without taking part in the reaction. When the reaction is completed sodium sulfite separates in the solid form by reason of the concentrated bisulfite solution used, and remains suspended in the solution of sodium sulfite, or in a mixed solution of neutral and acid sulfites, depending upon the quantity of sodium carbonate added. Or the solid sulfite may be added to and suspended in a solution of sulfite otherwise prepared. The mixture of solid and liquid sulfites is now preferably transferred to a converting tank where it is saturated with sulfur dioxid, preferably the gas from pyrites or sulfur burners, while agitating the solution to maintain suspended the solid sodium sulfite. During the treatment with sulfur dioxid, all the sulfite combines with additional sulfur dioxid and water to form the bisulfite, leaving solid bisulfite of soda suspended in the solution. Any excess of sulfur dioxid in the waste gases is conserved in a suitable absorber. After the reaction is completed, the solution and suspended solid bisulfite is transferred to a suitable separator, such as a centrifugal machine, and the solid separated from the liquor; the solid bisulfite of soda is now quickly dried, as in a vacuum drier, and quickly cooled. The bisulfite thus obtained is substantially free from water and does not give off its excess of sulfur dioxid when exposed to the air for a considerable time. The liquor from the solid bisulfite of soda is used as the starting solution for another operation.

In the accompanying drawing, the figure of which is a vertical longitudinal section of suitable apparatus for carrying out the process, a tank 1 has a manhole inlet 3, provided with an air-lock, which permits charging the apparatus while in use, a gas exit 4, a solution exit 5, and a suitable stirring means 6. Within the tank is placed the strong solution of bisulfite of soda, which may also contain some sulfite of soda, and the solid carbonate of soda, as above described, and the solution stirred. The carbonate of soda should not exceed that required to form the neutral sulfite of soda with the bisulfite, as indicated by the reaction above, otherwise carbon dioxid would be lost. The carbonic acid gas evolved passes out through the valved outlet 4 to a suitable scrubber, not shown, and collected. After the reaction is completed the solution of sodium sulfite, which may also contain some bisulfite, and the suspended crystals of sodium sulfite are run through pipe 7 to the converting tank 3 wherein it is constantly agitated by the stirrer 9 and subjected to the action of sulfur dioxid, preferably as burner gas, from pipe 10. The excess of gas is pumped out by pump 12 through an absorber, or scrubber 13, containing an alkaline liquid, such as sodium carbonate, wherein any excess of sulfur dioxid is recovered. After the reaction in the converting tank 8 is completed, the solution of sodium bisulfite and the suspended solid sodium bisulfite are run out through outlet 14 to a suitable separator, such as a centrifugal machine, not shown, where the solid is separated from the solution, and are then further quickly dried and cooled as above noted. Other alkaline bisulfites may also be made in this manner.

I claim:

1. The process of making solid sodium bisulfite, comprising treating solid sodium sulfite, substantially free from sodium carbonate, suspended in a solution containing a sodium sulfite, with a gas containing sulfur dioxid, thereby converting the suspended sodium sulfite into sodium bisulfite.

2. The process of making solid sodium bisulfite, comprising neutralizing sodium bisulfite in solution by the restricted addition of a solid alkaline sodium salt, thereby forming solid sodium sulfite, substantially free from sodium carbonate, suspended in a solution of sodium sulfite, then reacting upon the sulfites with a gas containing sulfur dioxid, thereby forming solid and dissolved sodium bisulfites, and separating the solid from the dissolved salt.

3. The process of making solid sodium bisulfite, comprising neutralizing sodium bisulfite in solution by the restricted addition of a solid alkaline sodium salt, thereby forming solid sodium sulfite, substantially free from sodium carbonate, suspended in a solution of sodium sulfite, then reacting upon the sulfites with a gas containing sulfur dioxid, thereby forming solid and dissolved sodium bisulfites, separating the solid bisulfite from the solution containing the dissolved bisulfite, and reusing the solution of bisulfite to form more neutral sodium sulfite.

4. The process of making a solid bisulfite, comprising suspending a solid sulfite, substantially free from a carbonate in a vehicle, and reacting upon said suspended solid sulfite with a gas containing sulfur dioxid, thereby forming a solid bisulfite.

5. The process of making solid sodium bisulfite, comprising bringing together a gas containing sulfur dioxid and solid sodium sulfite, substantially free from sodium carbonate, suspended in a suitable vehicle.

6. The process of making solid sodium bisulfite, comprising bringing together a gas containing sulfur dioxid and solid sodium sulfite, substantially free from sodium carbonate, suspended in a solution containing sulfite.

7. The process of making solid sodium bisulfite, comprising bringing together a gas containing sulfur dioxid and solid sodium sulfite, substantially free from sodium carbonate, suspended in a solution containing a sodium salt.

8. The process of making solid sodium bisulfite, comprising bringing together a gas containing sulfur dioxid and solid sodium sulfite, substantially free from sodium carbonate, suspended in a solution containing sodium sulfite.

9. The process of making solid sodium bisulfite, comprising treating sodium sulfite, substantially free from sodium carbonate, suspended in a solution containing a sodium sulfite with burner gas, thereby converting the suspended sodium sulfite into sodium bisulfite.

10. The process of making solid sodium bisulfite, comprising neutralizing sodium bisulfite in solution by the restricted addition of a solid alkaline sodium salt, thereby forming solid sodium sulfite, substantially free from sodium carbonate, and a solution of sodium sulfite, then reacting upon the sulfites with burner gas, thereby forming solid and dissolved sodium bisulfites, and separating the solid from the dissolved salt.

11. The process of making solid sodium bisulfite, comprising neutralizing sodium bisulfite in solution by the restricted addition of a solid alkaline sodium salt, thereby forming solid sodium sulfite, substantially free from sodium carbonate, in a solution of sodium sulfite, then reacting upon the sulfites with burner gas, thereby forming solid and dissolved sodium bisulfites, separating the solid bisulfite from the solution containing the dissolved bisulfite, and reusing the solution of bisulfite to form more neutral sodium sulfite.

12. The process of making a solid bisulfite, comprising suspending a sulfite, substantially free from a carbonate, in a vehicle, and reacting upon said suspended solid sulfite with burner gas, thereby forming a solid bisulfite.

13. The process of making solid sodium bisulfite, comprising bringing together burner gas and solid sodium sulfite, substantially free from sodium carbonate, suspended in a suitable vehicle.

14. The process of making solid sodium bisulfite, comprising bringing together burner gas and solid sodium sulfite, substantially free from sodium carbonate, suspended in a solution containing sulfite.

15. The process of making solid sodium bisulfite, comprising bringing together burner gas and solid sodium sulfite, substantially free from sodium carbonate, suspended in a solution containing a sodium salt.

16. The process of making solid sodium bisulfite, comprising bringing together burner gas and solid sodium sulfite, substantially free from sodium carbonate, suspended in a solution containing sodium sulfite.

In testimony whereof I affix my signature in presence of two witnesses.

HENRY HOWARD.

Witnesses:
I. M. GRAHAM,
M. V. O'BRIEN.

DISCLAIMER.

1,084,436.—*Henry Howard*, Boston, Mass. PROCESS OF MAKING SOLID SODIUM BISULFITE. Patent dated January 13, 1914. Disclaimer filed June 20, 1917, by the assignee, *General Chemical Co.*

Enters this disclaimer—

"To any aspect of all the claims of Letters Patent No. 1,084,436 in so far as they are capable of a construction which includes the subject-matter described and claimed in the Strickler patent, No. 1,023,179, of April 16, 1912."

[*Official Gazette July 3, 1917.*]

tially free from sodium carbonate, suspended in a solution containing a sodium salt.

16. The process of making solid sodium bisulfite, comprising bringing together burner gas and solid sodium sulfite, substantially free from sodium carbonate, suspended in a solution containing sodium sulfite.

In testimony whereof I affix my signature in presence of two witnesses.

HENRY HOWARD.

Witnesses:
 I. M. GRAHAM,
 M. V. O'BRIEN.

DISCLAIMER.

1,084,436.—*Henry Howard*, Boston, Mass. PROCESS OF MAKING SOLID SODIUM BISULFITE. Patent dated January 13, 1914. Disclaimer filed June 20, 1917, by the assignee, *General Chemical Co.*

Enters this disclaimer—

"To any aspect of all the claims of Letters Patent No. 1,084,436 in so far as they are capable of a construction which includes the subject-matter described and claimed in the Strickler patent, No. 1,023,179, of April 16, 1912."

[*Official Gazette July 3, 1917.*]

DISCLAIMER.

1,084,436.—*Henry Howard*, Boston, Mass. PROCESS OF MAKING SOLID SODIUM BISULFITE. Patent dated January 13, 1914. Disclaimer filed June 20, 1917, by the assignee, *General Chemical Co.*

Enters this disclaimer—

"To any aspect of all the claims of Letters Patent No. 1,084,436 in so far as they are capable of a construction which includes the subject-matter described and claimed in the Strickler patent, No. 1,023,179, of April 16, 1912."

[*Official Gazette July 3, 1917.*]